United States Patent [19]

Damico

[11] 4,197,219

[45] Apr. 8, 1980

[54] AQUEOUS POLYURETHANE-PHENOLIC-FORMALDE-HYDE RESIN EMULSIONS FOR USE AS ADHESIVES, PRIMERS AND SURFACE COATINGS

[75] Inventor: Dennis J. Damico, Erie, Pa.

[73] Assignee: Lord Corporation, Erie, Pa.

[21] Appl. No.: 4,097

[22] Filed: Jan. 17, 1979

[51] Int. Cl.$^2$ .............................................. C08L 61/14
[52] U.S. Cl. .......................................... 260/7; 260/6; 260/29.2 TN; 260/29.3; 427/388.3; 428/460; 428/461; 428/424.6; 428/425.8; 156/331
[58] Field of Search ........................................ 260/7, 6

[56] References Cited

U.S. PATENT DOCUMENTS

| | | | |
|---|---|---|---|
| 3,461,103 | 8/1969 | Kerberle ................................. | 260/6 |
| 3,479,310 | 11/1969 | Dieterich ...................... | 260/29.2 TN |
| 3,491,050 | 1/1970 | Kerberle ................................. | 260/6 |
| 3,862,060 | 1/1975 | Anderson et al. ........................ | 260/6 |
| 3,879,238 | 4/1975 | Bierman et al. ....................... | 156/327 |
| 3,892,986 | 9/1976 | Stone ..................................... | 310/42 |
| 3,981,762 | 9/1976 | Daves .................................... | 156/322 |
| 4,066,591 | 1/1978 | Scriven et al. ............... | 260/29.2 TN |
| 4,096,127 | 6/1978 | Schurmann .................. | 260/29.2 TN |
| 4,110,284 | 8/1978 | Violland et al. ............. | 260/29.2 TN |
| 4,141,871 | 2/1979 | Shimp et al. ................. | 260/29.2 TN |

*Primary Examiner*—Edward M. Woodberry
*Attorney, Agent, or Firm*—John A. Gazewood

[57] ABSTRACT

Stable aqueous emulsions useful as coatings, primers for promoting vinyl plastisol adhesion to metal, and adhesives for bonding vinyl to metal with high environmental resistance, are described, which comprise: (a) aqueous polyurethane latexes substantially free of emulsifier and containing about 0.02 to 1% of a salt type group from the class consisting of

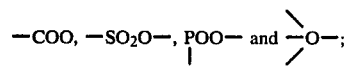

(b) an aqueous casein cocondensed phenolic-formaldehyde resin emulsion; and (c) an ionic fluorocarbon surfactant; in proportions of about 25 to 99% (a), about 1 to 50% (b) and about 1 to 10,000 parts per million (c), by weight of the total composition. Such emulsions are useful per se as coatings and primers and single package adhesives. Two-package adhesives having superior properties are provided, in which the foregoing emulsions as part A are cured by a crosslinker, part B, in a ratio A:B in the range from about 100 to 2.5A:1B. The crosslinking agents may be glyoxal, melamineformaldehyde resins, or any formaldehyde donor.

12 Claims, No Drawings

AQUEOUS POLYURETHANE-PHENOLIC-FORMALDEHYDE RESIN EMULSIONS FOR USE AS ADHESIVES, PRIMERS AND SURFACE COATINGS

Background Of The Invention

An enormous demand has developed in the art for means for successfully adhesively bonding resin films, and particularly vinyl chloride-containing polymers, to metal substrates in order to obtain a combination sheet or article having the appearance, feel and corrosion resistance of the resin film and the structural strength, fire-resistance and other desirable properties of the underlying metal. While a wide variety of adhesives, adhesive systems and processes have been developed for this purpose, a continuing need exists for improved means for bonding vinyl to metal and particularly for an adhesive means for achieving a bond having improved resistance to environmental conditions, including mechanical distortion of the laminate on exposure to moisture. In view of the increasing awareness of the hazards of oganic solvents and consequent legislative pressures to limit their use, it would be especially desirable to provide a water-based adhesive for these purposes, particularly one providing improved environmental resistance. There is also a need in the art for similar coatings and, especially for primers for promoting vinyl plastisol adhesion to metals.

The Prior Art

Among the attempts to provide improved systems for adhesively bonding vinyl to metal may be mentioned Bierman et al U.S. Pat. No. 3,879,238 issued Apr. 22, 1975. This patent describes the formation of strong durable bonds between metals and vinyl chloride-containing polymers by maintaining, at a surface of the metal, a layer of polymer that contains pendant carboxylic acid groups. One surface of that polymer layer is in contact with the metal while the other surface has been modified by treatment with an oxidizing or etching agent. An adhesive is then applied between the modified surface and the vinyl chloride-containing polymer to be bonded thereto, and the laminate is heated above 120° C. for a time sufficient to form a unitary bonded structure. The adhesive comprises (A) between 10 and 50% by weight of synthetic rubber containing at least 20% acrylonitrile, and (B) between 50 and 90% by weight of a cross-linkable phenol-aldehyde resin.

Daves et al U.S. Pat. No. 3,981,762 issued Sept. 21, 1976 describes a method of bonding a resin film with three-dimensional patterned surface to sheet metal in which a coating of curing adhesive on the metal surface is partially cured to a firmer condition in an initial heating, the metal and adhesive are cooled to a temperature at which the cure rate is slowed but the adhesive is tacky for adhesive engagement with the resin film, the resin film is pressed against the adhesive, and the assembly promptly chilled. The adhesive comprises a urethane prepolymer, a terpolymer of vinyl chloride, vinyl acetate and maleic anhydride (VMCH), a phenolic B-stage resin and chlorinated rubber.

Stone et al U.S. Pat. No. 3,982,986 issued Sept. 28, 1976 describes the lamination of saran films to treated polyethylene films or surfaces by means of thermoplastic polyether polyurethanes applied to the substrates as aqueous solutions by conventional laminating techniques.

Dieterich and Bayer U.S. Pat. No. 3,479,310 issued Nov. 18, 1969 describes polyurethanes which are capable of being dispersed in water without the aid of an emulsifying agent since they contain from about 0.02 to about 1% by weight of certain salt groups.

It is apparent, therefore, that various approaches have been taken in the prior art to the problem of laminating vinyl polymers to other plastic sheets or to metal and that aqueous as well as organic solvent systems have been tried with varying degrees of success.

While polymer latexes for laminating are already known, they have not provided both good levels of adhesion between vinyl and metal, and good environmental resistance, particularly to boiling water. More specifically, previously available phenolics, cross-linked ethylene/acetate copolymers, cross-linked acrylics and the like, which offer good environmental qualities, afford relatively poor adhesion to plasticized vinyl and also tend to be quite rigid. Inasmuch as the various polymer latexes of the prior art failed to provide the desired combination of good initial adhesion and environmental resistance, it occurred to the art to attempt to achieve this end by blending available materials. While the blending route to improved performance has become the standard approach, it has rarely provided significantly improved performance above that of the individual components of the blend alone.

More specifically, urethane thermoplastics, of both the emulsion and solution types are well known for their ability to bond vinyl films. Such urethanes, however, lack the bonding versatility and environmental resistance to heat and boiling water which are desired. Curable phenolics, conversely, generally have good adhesion to metals and good environmental resistance as well. Therefore, the blending of phenolic dispersions and emulsions with urethane latexes would seem to be a possible route to the desired combination of adhesion and environmental properties in a vinyl to metal bond. Unfortunately, however, blending such phenolic and urethane latexes normally results in gelation or coagulation of the mixture since these materials are generally incompatible, even with careful adjustment of pH and added surfactants.

It is apparent from the state of the prior art, therefore, that a need remains for improved adhesives for bonding vinyl to metal or other substrates, and particularly for aqueous systems providing highly environmentally resistant bonds.

It is a primary object of the present invention, therefore, to provide improved adhesive systems for bonding vinyl to metal which provide bonds having a high level of environmental resistance.

It is a specific object of the invention to provide vinyl to metal adhesives which provide bonds resistant to standard dimpling and boiling water tests.

It is another object of the invention to provide a blend of normally incompatible urethane and phenolic latexes which provide the desired combination of initial adhesion and environmental resistance in a degree not obtainable from either latex alone or from other known polymer latexes or blends thereof.

It is still another object of the invention to provide improved coatings and primers, and, in particular, primers useful in promoting vinyl plastisol adhesion to metals.

It is yet another object of the invention to provide improved adhesives, coatings and primers based on polyurethane dispersions in water which are free from emulsifier.

Summary Of The Invention

The foregoing and other objects of the invention which will become apparent hereinafter, are achieved by providing new aqueous compositions in the form of stable emulsions or dispersions which contain:

(a) an aqueous polyurethane latex, containing from about 0.02 to about 1% of the dispersed phase of a salt type group selected from the class consisting of

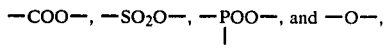

and having a solids content of about 30 to about 70% by weight.

(b) an emulsion selected from the group consisting of aqueous casein cocondensed phenolic-formaldehyde resin emulsions, such emulsions having a solids content of about 40 to about 60% by weight; and (c) a nonionic fluorocarbon surfactant;

the total composition containing about 25 to about 99% (a), about 1 to about 50% (b), about 1 to about 10,000 parts per million (c), and having a total solids content of about 15 to about 30%, all by weight of the total composition.

The stable aqueous dispersions or emulsions having the foregoing composition, may be employed as known per se in the art as surface coatings, primers for promoting the adhesion of vinyl plastisols to metals or for other purposes; or as adhesives for bonding vinyl to metal providing bonds highly resistant to environmental exposure including moisture and even boiling water, and also being highly resistant to rupture by deformation.

The stable aqueous dispersions are curable by crosslinking with glyoxal or any material acting as a formaldehyde donor. The amount and type of crosslinking agent is determined to some extent by the composition and nature of the formulation, little or no crosslinker being used in coatings and primers or single package adhesive compositions. In preferred two-package adhesive systems, in which the stable aqueous dispersions recited above are separately packaged as part A of the adhesive system and the crosslinking agent is separately packaged as part B, the two materials are mixed prior to use in proportions of A:B in the range from about 100 to 2:5A:1B. When parts A and B are packaged separately in plastic lined containers they may be stored indefinitely. The adhesive obtained by mixing parts A and B remains usable for up to a week, but it is preferred to use it immediately after mixing or at least within two days for best results.

The new coatings, primers and adhesives, being water based, offer obvious economic and environmental advantages over the organic solvent types available in the art due to the avoidance of the expensive and hazardous solvents. While the new adhesives have their highest utility in bonding vinyl to metal, they may also have utility in laminating not only vinyl but other plastic films such as acrylics, Mylar, Saran and the like to themselves or to metals and for vinyl to vinyl bonding as well.

Detailed Description Of The Invention

The Polyurethane Emulsions

The polyurethane emulsions or dispersions, component (a), used in the compositions of the present invention are known in the art per se, having been described in Dieterich and Bayer U.S. Pat. No. 3,479,310 issued Nov. 18, 1969, the entire disclosure of which is hereby incorporated herein by reference. Such polyurethane dispersions are entirely free of emulsifying agents and are obtained by the dispersions in water of polyurethanes containing from about 0.02 to about 1% by weight of salt type groups which render the polyurethanes self-emulsifying. The polyurethanes are prepared employing compounds having acid groups which can be neutralized by base and which may be incorporated into the polyurethane components in either monofunctional or polyfunctional form. The acid groups are then converted to the salt to produce the self-dispersible polyurethanes. The recited proportions of salt groups are critical in order to avoid complete solution of the polyurethane. As noted above, it is not necessary to incorporate the salt forming components into the polyurethane in bifunctional or polyfunctional form as is customary with other components in the preparation of polyurethane prepolymers, since they may be introduced as monofunctional compounds such as halogen alcohols and amino acids. The salt type group is, however, preferably chemically bonded to the polyurethane.

Any suitable process of preparing the polyurethane latices may be used for the preparation of the anionic latices of the present invention. The resulting polyurethane plastics obtainable from these latices are free from emulsifiers and are predominantly hydrophobic in character and free from hydrophilic low molecular weight impurities. The polyurethanes are preferably predominantly linear and are produced from polyhydroxyl compounds which have a molecular weight preferably of from about 300 to about 10,000, organic polyisocyanates and, if desired, chain lengthening agents. In the production of the polyurethane dispersions, a component having at least one salt type group is included. This may be a compound with active hydrogen atoms as determined by the Zerewitinoff method and thus capable of reacting with an isocyanato group or it can be an isocyanate. It is also possible to use some of each so long as the final product for dispersion or the final product in the dispersion has from about 0.02 to about 1% by weight of the salt type groups. If the organic compound has at least two active hydrogen containing groups and contains the salt type group or group capable of salt formation, or if the isocyanate contains a plurality of isocyanate groups, these compounds may be the sole compounds used to prepare the polyurethane polymer. The chain lengthening agents may have the salt type group. After the prepolymer is formed, which has the group capable of forming a salt, the reaction mixture is converted into an aqueous latex by reaction of the salt type groups with a base. It is sometimes desirable to prepare the initial polymer in an inert organic solvent and subsequently convert the polymer into an aqueous latex, for example, by the known methods for vinyl polymers.

As noted above, the preferred polyhydroxyl compounds have a molecular weight in the range from about 300 to 10,000, but it is especially preferred to employ predominantly linear compounds having an average molecular weight in the range from about 500 to 4000. The most suitable polyhydroxyl compounds include polyalkylene ether glycols, dihydroxyl polyesters, dihydroxy polyacetals and dihydroxy polythioethers. Any suitable polyalkylene ether glycol may be used including those prepared from tetrahydrofuran, propylene oxide, co-polymerization products or graft polymerization products of these compounds such as the products of the addition of the afore-mentioned polyalkylene oxides and polystyrene and the like. It is also possible to use mixed polyethers obtained, for example, by the condensation of 1,6-hexane diol, 3-methyl-1,6-hexane diol, 1,7-heptane diol, 1,8-octane diol or the like with or without the addition of 10 to 30% of lower glycols such as, for example, ethylene glycol, 1,2-propane diol and the like. In addition, one may use propoxylated and ethoxylated or mixed propoxylated and ethoxylated glycols such as propoxylated butane diol.

Any suitable polyacetal may be used, but it is preferred to use the water soluble types, for example, those from 1,6-hexane diol and formaldehyde, from 4,4'-dihydroxy-ethoxy-diphenyl-dimethyl-methane and formaldehyde and the like.

Any suitable polyester may be used such as, for example, those obtained from polyhydric alcohols and polycarboxylic acids. Any suitable polyhydric alcohol, but preferably a dihydroxy alcohol such as, for example, diethylene glycol, 1,2-propane diol, 1,4-butane diol, 1,6-hexane diol and the like together with minor amounts of trimethylolpropane, glycerine or the like may be used. Any suitable polycarboxylic acid may be used such as, for example, adipic acid, phthalic acid, terephthalic acid, sebacic acid, suberic acid, azelaic acid or the like together with minor amounts of tricarboxylic acids such as, for example, 1,3,5-benzene tricarboxylic acid and the like.

It is also possible to use polyhydroxyl compounds which contain urethane or urea groups as well as mixtures of the various polyhydroxy compounds including hydrophilic polyethers, such as polyethylene glycol, polyesters and polyacetals. It is preferred to use predominantly hydrophobic polyhydroxyl compounds and hydrophilic polyhydroxyl compounds should only be used in certain proportions which will not harm the final product. In general, less than about 25% of the polyhydroxyl compound should be of the hydrophilic type. It is also possible to use natural polyols such as castor oil, hydroxylated tall oil, carbohydrates and the like.

The salt type or salt forming group may be in the organic polyisocyanate or polyhydroxyl compound and components suitable for the preparation of salt containing polyisocyanates and polyhydroxyl compounds are disclosed below.

Any suitable organic polyisocyanate may be used, but it is preferred to use organic diisocyanates and especially aliphatic and aromatic diisocyanates such as, for example, 1,5-naphthylene diisocyanate, 4,4'-diphenylmethane diisocyanate, 4,4'-diphenyl-dimethylmethane-diisocyanate, di- and tetralkyl-diphenyl-methane diisocyanate, 4,4'-dibenzyl diisocyanate, 1,3-phenylene diisocyanate, 1,4-phenylene diisocyanate, toluylene diisocyanate, chlorinated and brominated isocyanates, isocyanates containing phosphorous, butane-1,4-diisocyanate, hexane-1,6-diisocyanate, dicyclohexylmethane diisocyanate, and cyclohexane-1,4-diisocyanate. Isocyanates which deserve to be specially mentioned are partially masked isocyanates which enable formation of self-cross linking polyurethanes, e.g., dimeric toluylene diisocyanate as well as polyisocyanates which have been partially or completely reacted e.g. with phenol, tertiary butanol, phthalimide or caprolactam and which, when they are completely masked, at first do not take part in the reaction but are simply mixed into the reaction mixture.

Chain lengthening agents with reactive hydrogen atoms which could also be used would be, for example, the usual glycols such as ethylene glycol, di-, tri- and tetraethylene glycol, 1,4-butane diol, propane diol-1,2, propanediol-1,3, neopentylglycol, dihydroxyethoxyhydroquinone, dihydroxyethyldiane, and also diamines, e.g. ethylene diamine, hexamethylenediamine, hydrazine, ammonia, benzidine, diaminodiphenylmethane, aminoalcohols such as ethanol amine and water.

As compounds which contain at least one hydrogen atom reactive with isocyanate groups or at least one isocyanate group and at least one group capable of salt formation there may be used alone or in admixture the following compounds:

Compounds which contain isocyanate groups capable of salt formation: chlorohexylisocyanate, m-chloromethylphenyl-isocyanate, p-chlorophenyl-isocyanate, bis-chloromethyl-diphenylmethane diisocyanate, 2,4-diisocyanate-benzyl chloride, 2,6-diisocyanate benzyl chloride and N-(4-methyl-3-isocyanate-phenyl)-beta-bromoethyl-urethane.

Compounds which contain carboxylic acid groups or hydroxyl groups capable of salt formation:

(a) Hydroxy and mercapto carboxylic acids: glycollic acid, thioglycollic acid, lactic acid, trichlorolactic acid, malic acid, dihydroxymaleic acid, dihydroxyfumaric acid, tartaric acid, dihydroxy-tartaric acid, mucic acid, saccharic acid, citric acid, glycerol boric acid, pentaerythritol boric acid, mannitoboric acid, salicyclic acid, 2,6-dihydroxy-benzoic acid, protocatechuic acid, beta-resorcylic acid, alpha-resorcylic acid, hydroquinone-2,5-dicarboxylic acid, 4-hydroxy-isophthalic acid, 4,6-dihydroxy-isophthalic acid, oxyterephthalic acid, 5,6,7,8-tetrahydro-naphthol-2-carboxylic acid-3, 1-hydroxynaphthoic acid-2, 2,8-dihydroxynaphthoic acid-3, beta-oxypropionic acid, m-oxybenzoic acid, pyrazolone-carboxylic acid, uric acid, barbituric acid, resoles and other phenol-formaldehyde condensation products.

(b) Polycarboxylic acids: sulphone diacetic acid, nitrilo-triacetic acid, ethylene diamine-tetracetic acid, diglycollic acid, thiodiglycollic acid, methylene-di-thio-glycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalinic tetracarboxylic acid-(1,4,5,8), o-tolylimido-diacetic acid, beta-naphthylimido-diacetic acid, pyridine-di-carboxylic acid and dithiodipropionic acid.

(c) Aminocarboxylic acids: oxaluric acid, anilido acetic acid, 2-hydroxy-carbazole-carboxylic acid-3, glycine, sarcosine, methionine, alpha-alanine, beta-alanine, 6-aminocaproic acid, 6-benzoyl-amino-2-chlorocaproic acid, 4-aminobutyric acid, aspartic acid, glutamic acid, histidine, anthranilic acid, 2-ethylamino-benzoic acid, N-(2-carboxyphenyl)-aminoacetic acid, 2-(3'-amino-benzenesulphonyl-amino)-benzoic acid, 3-aminobenzoic acid, 4-amino-benzoic acid, N-phenylaminoacetic acid, 3,4-daminobenzoic acid, 5-aminobenzene-dicarboxylic acid and 5-(4'-aminobenzoyl-amino)-2-aminobenzoic acid.

(d) Hydroxy- and carboxy-sulphonic acids: 2-hydroxy-ethanesulphonic acid, phenolsulphonic acid-2, phenolsulphonic acid-3, phenolsulphonic acid-4, phenoldisulphonic acid-2,4, sulphoacetic acid, m-sulphobenzoic acid, p-sulphobenzoic acid, benzoic acid-1-disulphonic acid-3,5, 2-chlorobenzoic acid-1-sulphonic acid-4, 2-hydroxybenzoic acid-1-sulphonic acid-5, naphthol-1-sulphonic acid, naphthol-1-disulphonic acid, 8-chloronaphthol-1-disulphonic acid, naphthol-1-trisulphonic acid, naphthol-2-sulphonic acid-1, naphthol-2-trisulphonic acid, 1,7-dihydroxy-naphthalenesulphonic acid-3, 1,8-dihydroxynaphthalene-disulphonic acid-2,4, chromotropic acid, 2-hydroxynapthoic acid-3-sulphonic acid-6, and 2-hydroxycarbazole-sulphonic acid-7.

(e) Aminosulphonic acids: aminosulphonic acids, hydroxylamine-monosulphonic acid, hydrazine-disulphonic acid, sulphanilic acid, N-phenyl-aminomethane-sulphonic acid, 4,6-dichloroaniline-sulphonic acid-2, phenylene-diamine-1,3-disulphonic acid-4,6, N-acetyl-naphthylamine-1-sulphonic acid-3, naphthylamine-1-sulphonic acid, naphthylamine-2-sulphonic acid, naphthylamine-disulphonic acid, naphthylamine-trisulphonic acid, 4,4'-di-(p-amino-benzoyl-amino)-diphenyl urea-disulphonic acid-3,3', phenyl-hydrazine-disulphonic acid-2,5, 2,3-dimethyl-4-aminoazo-benzene-disulphonic acid-4',5, 4'-amino-stilbene-disulphonic acid-2,2'-<4-azo-4>-anisole, carbazole-disulphonic acid-2,7, taurine, methyl-taurine, butyltaurine, 3-aminobenzoic acid-1-sulphonic acid-5, 3-amino-toluene-N-methane-sulphonic acid, 6-nitro-1,3-dimethylbenzene-4-sulphaminic acid, 4,6-diaminobenzene-disulphonic acid-1,3, 2,4-diamino-toluene-sulphonic acid-5, 4,4'-diamino-diphenyl-disulphonic acid-2,2', 2-aminophenol-sulphonic acid-4, 4,4'-diamino-diphenylether-sulphonic acid-2, 2-amino-anisole-N-methanesulphonic acid and 2-amino-diphenylamine-sulphonic acid.

Suitable salt-forming agents are inorganic and organic bases, e.g. sodium hydroxide, potassium hydroxide, potassium carbonate, sodium hydrogen carbonate, ammonia, primary, secondary and tertiary amines. Finally, inorganic phosphorous compounds may also be used as compounds capable of salt formation, and these include both basic phosphines which are capable of being incorporated in the molecule, such as diethyl-beta-hydroxyethylphosphine, methyl-bis-beta-hydroxyethylphosphine, tri-beta-hydroxy-methylphosphine, and derivatives such as phosphinic acids, phosphonous acids, phosphonic acids, and esters of the phosphorous, phosphoric acids, and their thioanalogues, e.g. bis-(alpha-hydroxy-isopropyl)-phosphinic acid, hydroxyalkane-phosphoric acid, phosphoric acid-bis- glycollic ester.

The salt-forming components can be added in the course of the production of the polyurethane at any suitable time either with or without the presence of solvents, and the salt formation taking place either during the formation of the basic polyurethane polymer or at the time of the dispersion. Where the salt-forming components are polyfunctional they may either partly or entirely replace the other polyhydroxy compounds set forth above or the polyisocyanate or the chain lengthening agents provided that the critical amount of salt type component is present in the compound. The ratio of the total of —NCO groups to the total of reactive hydrogen atoms is determined by the type of product desired. If the initial product is to be soluble in organic solvents, the molar ratio of —NCO groups to active hydrogen atoms is preferably between about 0.4:1 and about 1.5:1, most preferably 9.9:1 to 1.2:1. The pre-adduct is generally formed first from the high molecular weight polyhydroxyl compound either as a melt or as a solution by reaction of the polyhydroxyl compound with an organic polyisocyanate. This preadduct is then reacted with a chain lengthening agent in solution, if desired. In principle, this method could also be used in cases where the salt component or the component capable of salt formation is only monofunctional and therefore does not react like a chain lengthening agent. Where all monofunctional salt forming components are used it is frequently advantageous to add a trifunctional component or higher functional component including trimethylolpropane, a diamine such as ethylene diamine, an organic polyisocyanate, such as triphenylmethane triisocyanate, or even water in order to compensate for the interruption of the chains by the monofunctional component.

On the other hand, it may be advisable to incorporate the salt-forming component into the preadduct. This is especially true for salt-forming components which are in themselves monofunctional such as salts of hydroxy- or amino-carboxylic acids or sulphonic acids and especially where the polyhydroxy compound contains the salt-forming components.

It is possible to add the component capable of forming a salt together with a component which produces the salt, thus producing the salt in situ.

After the formation of the preadduct, an organic solvent is preferably added and the reaction is preferably continued at a relatively low temperature of about 20 to about 100° C., especially where very reactive chain lengthening agents are used. Thus, the polyurethane preadduct remains of a low viscosity so that it can be easily stirred into the aqueous phase. It is preferred that the solvents be of essentially nonflammable character and at most they contain no more than 20% by weight of the polyurethane of a solvent which is hydrophobic or inflammable. The choice of solvents is important for the production of the aqueous latex dispersion in a later stage. It is preferable for the polyurethane latex to be completely free from solvent, so that the solvent added in the course of the process in order to make the preadduct easier to work up should be one which is easily removed from the water containing phase by distillation. Therefore, the preferred solvents are benzene, ethyl acetate, acetone, methyl ethyl ketone and the like. Other solvents may be used, but should not have a boiling point above that of water and should be inert to isocyanates provided that the solvent is to be added during the course of the reaction while free isocyanato groups are present. If it is desired to dilute the reaction mass after the reaction is completed, lower alcohols such as methanol can be used.

It is not always necessary to use a solvent and the whole reaction can be carried out in the melt without any solvent to obtain a rubbery mass which is subsequently dissolved in a polar or non-polar and or water containing solvent. The solubility of the polyurethane in an aqueous organic medium or the solubility of the water in the polyurethane which contains solvent depends mainly on whether the mass contains too many or too few salt type groups in accordance with the invention.

If the polyurethane mass is not formed as a salt, the high molecular weight polyurethane formed is subsequently, if desired in solution converted into a salt by adding the neutralizing agent, if necessary leaving it to react for some time at elevated temperature. Although the neutralization generally takes place sufficiently rapidly even at room temperature, it is sometimes desirable to heat for about 10 to about 180 minutes at about 50° to 120° C. The quality of neutralization agent depends on the quality of salt forming groups present in the polyurethane mass. An excess may be useful only in the case of volatile compounds which are easily removed. It is frequently useful to have slightly less than an equivalent quantity of neutralizing agent, in order to ensure a favorable pH of the reaction. medium. However, it is also possible to convert only a fraction of the groups capable of salt formation in the polyurethane mass into the form of a salt.

The proportion of salt type groups must be about 0.02 to about 1% "salt type group" is understood to means, for example, the following groups:

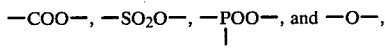

The polyurethane mass converted into the form of a salt now has unlimited compatibility with water and can be converted into an aqueous latex by the methods usually employed in the chemistry of elastic and plastic polymers. A preferred method consists in diluting the polyurethane mass, which carries salt-type groups and is dissolved in a polar solvent, with about 70 to about 150% of its weight of water, and then largely or completely distilling off the organic solvent under reduced pressure. On dilution with water, a homogeneous molecular disperse solution is first formed, which on further addition of water becomes opaque and is converted into a colloidal disperse solution. In the course of the removal of organic solvent, the particle size continues to increase so that finally a coarsely dispersed stable latex is formed which generally has a solids content of about 30 to 70% by weight.

It is possible to use other methods for taking the polyurethane mass into the aqueous phase, e.g., the organic polyurethane solution may be run into the given quantity of water while stirring vigorously, and the organic solvent may be removed at the same time or afterwards. Nonpolar solvents may be used in both methods, an emulsion being formed in the presence of water.

It is also possible to inject the still liquid polyurethane mass free from solvent into water, e.g. by means of nozzles, with or without the use of compressed air, particles of the size of latex particles being then formed immediately. Ultrasonic waves may also be used for forming the dispersion.

However, it must be emphasized that such energy consuming arrangements are not necessary and that the latices may be produced in a simple manner as described above.

The latices are in any case stable without the addition of an emulsifier. However, for certain purposes, where the latices would be subjected to particularly high mechanical or chemical stresses such as in electrolyte, small quantities of stabilizers may be added to the finished latex. When a stabilizer is used, the electric charge of the polyurethane must be taken into account. It is preferred to use neutral stabilizers, e.g. oleyl alcohol polyglycol ethers or oxyethylated phenols.

It is, of course, also possible to use protective colloids, for example, casein which has been opened up by ammonia may be used.

While a wide variety of polyurethanes have been described above as useful in making the component (a) latexes, especially preferred polyurethanes are those derived from the following commercially available diisocyanates: butane-1,4-diisocyanate, 1,6-hexane diisocyanate, isophorone diisocyanate, diisocyanato hexanoic acid ethyl ester, trimethylhexane diisocyanate, xylylene diisocyanate, dicyclohexyl methane diisocyanate, cyclohexane 1,4-diisocyanate, 1-methyl cyclohexane-2,4 and 2,6-diisocyanate, and mixtures thereof. Suitable and especially preferred aromatic diisocyanates include 1,3- and 1,4-phenylene diisocyanate, 2,4- and 2,6-tolylene diisocyanate and 4,4'-diisocyanato diphenyl methane.

Representative useful commercial polyurethane latexes include primary adhesive grade latexes E-471 and E-469 available from Mobay Chemical Corp. The E-471 latex is the more rigid of the two and is especially preferred in the compositions of this invention. A number of coating grade polyurethane latexes may also be employed including those designated XP-D-401; XP-B-301; XP-D-402; XP-D-500; and E-723, all available from Mobay Chemical Corp. While all of these latexes are useful, XP-D-401 is especially useful and is comparable to E-471 for use in this invention. While many other latex laminating adhesives are available on the market from a number of manufacturers none other than those recited above have been found to provide the superior environmental resistance characteristic of the vinyl to metal bonds of the adhesives of the present invention.

The polyurethane latexes useful in the present invention generally have a solids content of about 30 to 70% by weight and usually about 35 to 40% by weight.

Preparation Of The Polyurethane Dispersions

EXAMPLE 1

About 250 g. of an adipic acid-hexanediol-neopentyl glycol-polyester are dried in vacuo at about 120° C. and reacted for about 2 hours with about 38.6 g. 1,6-hexane diisocyanate. About 150 ml. acetone (water content about 0.17%) are added to the viscous melt at about 80° C. and when the solution has been effected about 3.75 g. tartaric acid in about 110 ml. acetone are added, and the mixture is diluted with about 600 ml. acetone after about 3 hours. After about four hours stirring at about 55° C. the mixture is diluted with about 300 ml. acetone and reacted with about 2.82 g. triisopropylamine in about 30 ml. acetone. About 250 cc water are then stirred in and approximately half the acetone contained therein is distilled off. About 2 g. casein lactate in about 10% aqueous solution are added as protective colloid to the thinly liquid, milky white latex, and the remaining acetone is removed by further distillation.

About 400 g. of the 27% solution obtained are adjusted to pH 7 with dilute ammonia solution, about 22 cc. water are added dropwise and the acetone is distilled off. A 42% latex is obtained which after the addition of some casein that has been opened up by ammonia may be further concentrated. On drying, a sticky, rubbery mass remains behind which can be cured with polyisocyanates or with substances giving off formaldehyde.

EXAMPLE 2

About 250 g. of an adipic acid-hexanediol-neopentyl glycol polyester are dried in vacuo at about 120° C. and reacted for about 2 hours with about 38.6 g. 1,6-hexane diisocyanate. About 150 ml. acetone are added to the viscous melt at about 80° C. and after solution is effected, the solution of about 3.75 g. tartaric acid in about 80 cc. acetone and of about 2.52 g. triethylamine in about 30 ml. acetone (corresponding to a neutralization equivalent) are added in succession. After about 1 hour stirring at about 50° C. the solution is highly viscous and is diluted with about 750 ml. acetone.

About 400 g. of the opaque solution of the polyurethane salt are diluted with about 100 cc. acetone, and about 200 cc. water are slowly added dropwise with vigorous stirring. During the addition of water, the solution at first becomes highly viscous and somewhat non-homogeneous, and a thinly liquid, milky emulsion is then formed. When the acetone has been distilled off, a 36% thin latex remains behind which can be further concentrated by distilling off water. The latex shows a small sedimentation not earlier than after two months. It can, however, easily be redispersed by simply stirring. Without additional vulcanizing agents, the latex leaves behind on glass plate soft but tough, elastic and non-adhesive films which are stable to light.

EXAMPLE 3

The process is carried out as in Example 2 except that about 37.5 g. 1,6-hexane diisocyanate and about 4.5 g. triethylamine (corresponding almost to two neutralization equivalents) are used. At the end, the reaction mixture is diluted with about 800 ml. acetone.

About 400 g. of the opaque acetone solution of the polyurethane salt obtained are diluted with about 100 cc. acetone, and about 200 cc. water are added dropwise with vigorous stirring. The solution at first becomes clear and then turbid and non-homogeneous, and on further addition of water it rapidly becomes thin and milky. After distilling off the acetone, a 44% stable latex is obtained which produces elastic, non-sticky clear films.

EXAMPLE 4

In the procedure of Example 2 37.5 g. of 1,6-hexamethylene diisocyanate are employed. The tartaric acid solution additionally contains 2.8 g. of butane diol-1,4. After two hours stirring at 55° C. 300 ml. of acetone are added. 250 g. of the polyurethane solution are diluted with 250 ml. of acetone and a solution of 2.8 g. of diethanol amine in 300 ml. of water is added. When the acetone has been distilled off, a milky-white latex is obtained, which does not alter within a storage time of eight months.

EXAMPLE 5

250 g. of polypropylene ether glycol (molecular weight 2000) are stirred for two hours at 80° C. with 114 g. of toluylene diisocyanate (2.4- and 2,6isomers like 65:35). Then a solution of 61 g. of thiodiglycol and 0.05 g. of dibutyltindilaurate in 150 ml. of acetone (OH content 0.2 percent) are added. After stirring for 1.5 hours at 55° C. 200 ml. of acetone are added and further 456 cc. of acetone after further two hours.

300 g. of the viscous polyurethane solution have added thereto 2.85 ml. of dimethyl sulfate. The mixture is heated for four hours to 60° C., then diluted with 300 ml. of water. When the acetone has been distilled off, a 30 percent thin latex remains which has a pH value of 1,2 and nevertheless is stable for several weeks.

EXAMPLE 6

250 g. of the polyester of Example 2 are dried in vacuo at 120° C. and reacted for 1.5 hours with 35 g. of 1,6-hexane diisocyanate. 27 g. of a 30 percent aqueous solution of the sodium salt of N-methyl-taurine are added at 70° C. and then 370 ml. of acetone in portions of 50:70 ml. each are added. The solution is diluted with 400 ml. of water slowly within 30 minutes while the solution is firstly highly viscous and then thinly liquid and milky. When the acetone has been distilled off, a rather coarsely disperse, but stable 42 percent latex remains behind which dries to elastic non-sticky and light stable films.

EXAMPLE 7

The procedure starts as in Example 6. Instead of the sodium salt of N-methyl-taurine 6.25 g. of $\beta$-bromo ethanol and 0.02 ml. of dibutyltindilaurate are employed. The mixture is heated for one hour to 90° C. Then at 60° C. a solution of 1 ml. of diethylene triamine in 170 ml. of acetone is added, the solution becoming viscous thereafter and is diluted with 200 ml. of acetone.

The solution is heated with 4 g. of pyridine for four hours to 100° C. and has added thereto 400 ml. of water. When the acetone has been distilled off, a 45 percent stable latex remains behind.

The Phenolic-Formaldehyde Resin Emulsions

The term "phenolic" is used herein generically to describe all types of resins derived from phenolic materials and formaldehyde or equivalents thereof, including the preferred resorcinol-formaldehyde novolac resins. The phenolic resins useful in the present invention are cocondensed with casein or its equivalents to aid in the emulsification of the finished resin in water. In general, the phenolic resins are prepared by initially reacting the phenolic material such as resorcinol, for example, with the casein or its equivalent and only a portion of the formaldehyde or its equivalent usually about 25%. The reaction is carried out under so called "neutral" conditions although the pH is generally on the acid side, e.g., about 3 to 4. Any suitable catalyst known to the art may be employed, ammonium compounds being preferred. The reaction mixture is placed in a stirred vessel with a condenser and heated to about 70° C. The heat of reaction then raises the temperature of the reaction mixture, typically to about 99° C. in a one liter batch, for example, but this will, of course, depend upon the size of the batch and other conditions as known per se in the art. The temperature should, however, be controlled by cooling if necessary and maintained in the range from about 90° to 100° C. The remainder of the formaldehyde is added slowly over a period of about 30 minutes while continuing stirring of the reaction mixture. The preparation of the cocondensed phenolic-formaldehyde resin is completed in about one hour under these conditions. The reaction mixture may be either acid or base catalyzed as known per se in the art, but it is preferred to employ about 0.01 mol of sodium hydroxide in a 1.5 to 1.7 mole batch of resorcinol to be reacted with one mole of formaldehyde.

The level of casein may range from about 2 to about 4% by weight based on the solids content of the resin and is preferably at least about 2.6% and most preferably about 3.5%. While as little as 1% casein may be employed, the resulting emulsions are of larger particle size as shown by light transmittance and are, therefore, less stable than those employing more casein. While more than 4% casein may be employed, tests have shown that there is no additional reduction in particle size or increase in stability. In addition to casein, other eqivalent small hydrophilic molecules may be cocondensed with the phenolic resins such as glycine or sulfamic acid at concentrations of about 0.01 to about 0.02 mole in a 1.5 to 1.7:1 molar ratio of resorcinol to formaldehyde in the resins.

The phenolic resins may be prepared employing varying proportions of the phenolic and formaldehyde reactants in a range of molar ratios of phenolic to formaldehyde of about 1 to 3:1, and preferably about 1.05 to 2:1, and most preferably, as noted above, at about 1.5 to 1.7:1.

A wide variety of phenolic compounds may be employed, including: both mono- and poly-substituted hydroxy benzenes, including such compounds having at least one aromatic necleus, and substituted derivatives thereof. Among the substituent groups which can be attached to the nucleus of the phenolic compounds are alkyl, alkoxy, amino, halogen and the like. In general, the phenols contain from 6 to 15 carbon atoms, preferably 6 to 10 carbon atoms. Representative phenolic compounds include, without limitation thereto, phenol, p-tert-butylphenol, p-phenylphenol, p-chlorophenol, p-alkoxyphenol, o-cresol, m-cresol, o-chlorophenol, m-bromophenol, 2-4-dimethylphenol, 2-ethylphenol, mesitol, resorcinol, orcinol, phloroglucinol, pyrocatechol, hydroquinone, pyrogallol, salicylic acid, bis-phenol A, and the like. Polyphenols having the hydroxy groups in the aromatic nucleus meta with respect to one another, such as phloroglucinol, orcinol, pyrogallol, and the like are preferred, resorcinol being especially preferred. While any phenolic resin or mixture thereof can be employed in the practice of the invention, it is preferred that the adhesive systems contain at least one phenolic resin comprising from about 5 to 100 mole percent, based on moles of phenolic constituent, of resorcinol, in an amount sufficient to provide from about 10 to 100 percent of total phenolic resin, with the cocondensing phenol being preferably an alkyl phenol such as cashew nut oil. Such cocondensate novolak phenolic resins provide substantially improved environmental resistance, especially at a resorcinol content in the range of about 60 to 98 mol percent, based on moles of phenolic compound. Suitable phenolic resins include both water-soluble and water-dispersible resinous materials having a molecular weight preferably in the range from about 200 to 2500, and including resinous oils as well as pulverulent solids.

Representative aldehydes which can be condensed with phenolic compounds to form the phenolic resins include, without being limited thereto, formaldehyde, acetaldehyde, propionaldehyde, isobutyraldehyde, 2-ethylbutyraldehyde, 2-methylpentaldehyde, 2-ethylhexaldehyde, as well as compounds which decompose to formaldehyde, such as para formaldehyde, trioxane, furfural, hexamethylene tetramine, acetals which liberate formaldehyde on heating, benzaldehyde, and the like.

The cocondensed casein-phenolic-formaldehyde resins may be emulsified in water by conventional techniques. A preferred method is to add cellosolve and water containing sodium hydroxide to the resin with stirring to the warm reaction mixture until emulsification is achieved. The amount of cellosolve may suitably be about 5 to 15%, usually about 10% by weight of the solids content of the resin. Less than about 0.2% sodium hydroxide is employed in an amount of water about equal to the solids content of the resin, by weight. This produces an emulsion containing about 40 to 60% resin, usually about 40 to 45% dry weight, and about 4 to 5% cellosolve, the remainder being water, which will amount to about 40 to 60% of the total emulsion. The casein content of the final emulsion, which is part of the resin solids referred to above, will be about 1 to 2%, usually about 1.3 to 1.5% of the total emulsion.

A typical phenolic-resin emulsion is prepared as follows.

Example 8

| Ingredient | M.W. | Moles | Weights Dry | Wet | Percentage |
|---|---|---|---|---|---|
| Resorcinol | 110 | 1.7 | 187.0 | 187.0 | 36.243 |
| Casein | | | 6.965 | 6.965 | 1.350 |
| Formaldehyde (37% aqueous) | 30 | 1.0 | 30.0 | 81.081 | 15.715 (5.7 dry) |
| Cellosolue | | | — | 21.810 | 4.227 |
| Sodium hydroxide | | | 0.418 | 0.418 | 0.081 |
| Water | | | — | 218.684 | 42.384 |
| | | | 206.383* | 515.958 | 100.00 |

*Total dry weight is compensated for water formed during the condensation.
Total solids content about 40% by weight.

The resin is suitably prepared in a two-liter reactor equipped with a stirrer, condenser and thermometer into which the resorcinol and casein (3.5% by weight of total solids) and about ¼ of the formaldehyde are introduced initially. The temperature of the reaction mixture is then raised to about 70° C. while the mixture is stirred rapidly. The heat of reaction is sufficient to raise the temperature to about 99° C. which is about the peak exotherm for a 1 liter batch. When the temperature drops to about 95° C., slow addition of the remaining formaldehyde may be started. The temperature is then maintained in the range from about 90° to 100° C. by controlling the rate of addition of formaldehyde which requires about 30 minutes. The reaction mixture is then heated to about 90° to 100° C. for one hour. The resulting product is nearly clear and amber in color. The heat source is removed and the cellosolve is added at which point the solution darkens slightly. The solution of sodium hydroxide in water is then added slowly. When about ¾ of the water had been added the mixture began to show signs of emulsification and the product was cooled to room temperature while continuing the stirring. This emulsion had a light transmittance of 96% at 565.5 nm, which indicates a highly stable emulsion of very small particle size.

General Procedure for Preparation of the Adhesives

Part A of the adhesive is completed by simply mixing one or more of the polyurethane latexes of Examples 1–7, or similar commercially available latexes, one or more of the phenolic resin emulsions and the required surfactant in the proportions recited above. The preferred surfactants are fluorocarbons. Imperial Chemical Industries, Ltd., manufacturers a series of Monflor surfactants that have been useful. One of these, Monoflor 52, has been particularly useful. Monflor 22 is believed to be produced by the ionic polymerization of tetrafluoroethylene and to have the empirical formula $(C_2F_4)_x$. It analyzes: C-41%; F-29%, by weight. It is 100% active, has a density of 1.32 g/cc, is very stable both thermally and chemically, and improves wetting, emulsification, spreading, and leveling of the adhesive.

The preferred method of mixing part A is to charge the polyurethane latex to the reactor vessel initially. The resorcinol-formaldehyde emulsion is charged to a separate vessel and the fluorocarbon surfactant is added thereto with stirring, which on the laboratory scale requires about 5 to 10 minutes. The addition time is not critical but the surfactant is added slowly enough to prevent formation of localized surfactant rich areas. The phenolic resin emulsion-surfactant mixture is then added to the polyurethane latex with stirring. Here again the time of addition is not critical but 5 to 10 minutes are normally required to achieve a homogeneous mixture. This procedure can also be carried out continously on a large scale. The resulting part A product is normally pinkish in color and has a viscosity range of about 0.012 to 0.03 Pa.sec.

Part B of the adhesive may be any aldehyde, dialdehyde or other material capable of condensation reactions with resorcinol- and phenol-base resins. Suitable materials include clyoxal and other dialdehydes, formaldehyde or resinous formaldehyde donors such as polyformaldehyde, ureaformaldehyde resins, such as dimethylolurea, and hexamethylene tetramine, paraformaldehyde, s-trioxane and anhydroformaldehydeaniline, although these materials are less preferred. The preferred part B crosslinking agents as noted above are the alkylated melamines. These are derived from hexamethoxy methyl melamine by substituting one or more of the methoxy groups with longer chains such as ethoxy or propoxy etc., and/or with hydroxyl groups. In this way a wide range of crosslinking agents is provided. The most preferred material is Cymel 385 available from American Cyanamid Co., which is derived as above and contains a significant proportion of hydroxyl groups.

EXAMPLE 9

Preparation Of A Preferred Part A Adhesive Composition

A commercial polyurethane latex of the type recited above, Mobay Latex E-471, was charged to a reacor vessel in an amount of 80.0 parts dry weight, 200 parts wet weight and 57.1% by weight of the final emulsion. A fluorocarbon surfactant, Monflor 52, described above, in 1% aqueous solution, in an amount of 0.5 parts dry weight, 50 parts wet weight and 14.3% of the final emulsion by weight, was added to 41.0 parts dry weight, 100.0 parts wet weight and 28.6% of the final emulsion of the resorcinol-formaldehyde resin emulsion of Example 8 in a separate vessel. The addition of the surfactant was carried out slowly with stirring over a period of 5 to 10 minutes to achieve a homogeneous mixture which was then added slowly to the polyurethane latex with stirring. Here again the addition took place over a period of 5 to 10 minutes until a homogeneous mixture was obtained and packaged for storage as part A of the preferred adhesive system. The Mobay latex E-471 sold under the trademark "Desmocoll", is a polyurethane latex having a milk-like appearance and a viscosity of about 0.1 Pa' sec, Brookfield LVF at 20° C. The latex should be stored at room temperature in containers not affected by water and must not be allowed to freeze.

Part B of this system was prepared by simply adding 1% of a turquoise dye to 99% by weight of Cymel 385 crosslinking agent, available from American Cyanamid Co. This is a high solids, partially methylated, melamine formaldehyde crosslinking agent having a low degree of alkylation and which is infinitely dilutible with water. The material has a viscosity of 0.600 to 1.00 Pa' sec., Gardner Holt at 25° C. and a total solids content of 80±2%. It has a stability at 25° C. of a minimum of six months and at 50° C. about two weeks. It is preferred, therefore, to store the part B crosslinker at 18° to 25° C.

Adhesive Pretest

In order to ensure the integrity of any lot of adhesive, a pretest has been developed. In this test about 4 ml of the phenolic or resorcinol resin emulsion such as that of Example 8, is introduced to a flask or vial. To this is added about 2 ml of 1% aqueous Monflor surfactant and the solution is mixed. This mixture should be light pink or orange in color and should not show any particle settling. About 8 ml of the polyurethane latex, such as Mobay latex E-471 is then placed in a separate flask. The 6 ml mixture of phenolic or resorcinol resin-surfactant emulsion is then added to the polyurethane latex with mixing. The raw materials pass the test if the mixture is light pink to white in color and has a low viscosity and no particle settling is observed. A failure is easily observed as the mixture rapidly turns to a paste having the consistency of cottage cheese. Failure of this test indicates that a new batch of the phenolic or resorcinol resin emulsion should be employed in the part A adhesive.

The Bond Test

In order to compare the adhesive bonds achieved by the new adhesives with others, a standard test procedure was developed as follows. Parts A and B of an adhesive system are mixed in the required ratio. Draw downs are made using the adhesive and 5.10 cm by 7.60 cm (2 in. by 3 in.) panels of 901 phosphatized cold rolled steel. The preferred dry film thickness is less than about 0.2 mils, and may be as low as 0.01 mils. The adhesive is allowed to dry for approximately one hour. Wood grained vinyl strips having the same dimensions as the metal (5.10 cm×7.60 cm) are cut and used as the substrate. The apparatus used for the bonding test is a "hot plate" that allows accurate temperature measurement and control, and two "washing machine rollers" for application of pressure. The bonding temperature used is 218° C. (425° F.). The metal parts, coated with adhesive, are placed on the hot plate for one minute at T=218° C. The metal plate and vinyl substrate are then placed in the rollers and pressed together. The laminated metal is then cross hatched and dimpled. Initial bond is tested on both the flat and dimpled surfaces. This is easily done by manually peeling back some of the vinyl on both surfaces and evaluating the percent vinyl retained by the metal. After the initial bond has been tested, the samples are placed in boiling water for one hour. All the vinyl is peeled off and evaluated on percent vinyl retention.

The Dimple Test

The dimple or ball test is a standarized test published by the U.S. Department of Commerce, Business and Defense Services Administration, Office of Technical Services, Commodity Standards Division as Commercial Standard CS245-62 Vinyl-Metal Laminates. In this test a steel ball 1" in diameter is pressed against the laminate in a die under hydraulic pressure until a dome is formed 1/16" below the previously determined fracture point of the vinyl or to a maximum of ⅜". The specimen is then inspected and an attempt made to pull the vinyl away from the metal in each of the quadrants. A second sample is treated with boiling water according to another standard procedure there set forth.

In order to illustrate the fact that the blended polyurethane latex-phenol/resorcinol formaldehyde resin adhesives of the invention provide stronger bonds than can be obtained with either of the ingredients alone, a series of compositions of varying proportions were made and tested. Laminates were prepared by coating phosphate treated panels with 0.1 to 0.5 dry mils of each adhesive. The coated panels were then bonded to ¼" plasticized vinyl sheet in a hot plate press using contact pressure and a 5 minute laminating cycle at 300° F. The adhesives tested were: 100% polyurethane, Desmocoll E-471, 100% resorcinol-formaldehyde resin emulsion of Example 8; and 80:20; 60:40; 40:60 and 20:80 ratio blends of the urethane to the resorcinol resin of Example 8. The peel or pull strength in pounds per linear inch (PLI) of the several samples as compared to the composition thereof was 5(100% polyurethane), 28(80:20 blend), 53(60:40 blend), 80(50:50 blend), 75(40:60 blend), 14(20:80 blend) and 0(100% phenolic). Very heavy (¼" thick) vinyl slabs were used in this study in order to test the higher than normal peel strengths provided by the new adhesives. Ordinarily, vinyl films are used and these rarely pull greater than 10 PSI making it impossible to determine whether the adhesive bond is greater than that in strength. The heavy slabs of vinyl, therefore, permitted determination of pull strengths much higher than are normally required to tear vinyl films. This series of tests also illustrates the broad range of proportions that give adhesion sufficient to tear vinyl films. As the data show, a composition of about 85% urethane and 15% resorcinol resin emulsion apparently would yield about 10 psi and one of 80:20 urethane to resorcinol resin emulsion yields a pull strength of about 28 psi. At the other end of the scale, an 85:15 urethane to resorcinol resin composition would apparently pull about 10 psi and the 20:80 composition pulls about 14 psi. The best composition of course is seen at the 50:50 ratio where the pull strength is very high at about 80 psi.

EXAMPLE 10

A series of four different compositions of the present invention were prepared and their properties compared as to initial adhesion, dimpled adhesion and adhesion after one hour in boiling water. The compositions were as follows:

1. 200 parts polyurethane latex ("Desmocoll" E-723, an emulsifier-free isocyanate-modified polyester available from Mobay Chemical Corp.);

90 parts trimethylol phenol (50% phenolic resole in "Cellusolve", an alkyl ether of ethylene glycol available from Union Carbide Corp.).

2. 200 parts polyurethane latex ("Desmocoll" E-471, an emulsifier-free isocyanate-modified polyester available from Mobay Chemical Corp.);

100 parts resorcinol-formaldehyde resin emulsion of Example 8 above.

20 parts polyoxymethylene, 20% dispersion in water.

3. 200 parts polyurethane latex ("Desmocoll" E-471);

90 parts trimethylol phenol (50% phenolic resole in "Cellosolve");

4. 200 parts polyurethane latex ("Desmocoll" E-471);

100 parts resorcinol-formaldehyde emulsion of Example 8 above;

75 parts alkylated melamine-formaldehyde resin crosslinker, ("Cymel 385" available from American Cyanamid Co.);

120 parts acrylic latex ("Rhoplex HA-16" available from Rohm & Haas Co.).

These adhesives were blended according to the general method of preparation described above and applied by means of a No. 10 wire wound bar to phosphatized steel panels. The panels were dried at room temperature and then heated 2 minutes at 425° F. and immediately bonded to a vinyl film by nip roll bonding. Each panel was then tested for adhesion between the vinyl film and metal plate for initial adhesion, adhesion after the standard dimple test described above, and for adhesion after one hour immersion in boiling water.

Sample 1, the urethane latex (E-723)—trimethylol phenol resole adhesive bond, gave an initial peel or pull strength of 8 to 10 pounds per linear inch (PLI) but failed both the dimple and boiling water tests. Sample 2, the urethane latex (E-471)—resorcinol formaldehyde emulsion bond (of Example 8), gave a stock break on initial pull, i.e., the vinyl film ruptured indicating that the adhesive bond was stronger than the film. This sample also passed the dimple test, but only partially passed the boiling water test giving only spotty adhesion. Sample 3, the polyurethane latex (E-471)—trimethylol phenol resole bond gave a stock break on initial pull and passed both the dimple and boiling water tests. Sample 4, containing the polyurethane (E-471)—resorcinol-formaldehyde emulsion blend and the acrylic latex, and cross-linked by the modified melamine formaldehyde resin, gave an initial stock break and passed both the dimple and boiling water tests.

Controls based on carboxylated vinyl latex blends ("Geon" 460-×-1/460-×-2, from B. F. Goodrich Chemical Co.) and blends of carboxylated vinly with ethylene/vinyl acetate latex ("Elvace" from E. I. duPont de Nemours Co.) passed the initial adhesion test but failed both the dimple and boiling water tests.

EXAMPLE 11

Comparison Of The Urethane-Phenolic/Resorcinol Latex Blends With Other Latex Laminating Adhesives A series of eight different adhesives of the present invention and prior art were prepared and their properties compared as to initial adhesion and adhesion after one hour in boiling water. The compositions were as follows:

A. 100 parts ethylene/vinyl acetate emulsion "Elvace" 1875 from E. I. duPont de Nemours Co.);

4 parts glyoxal (50% aqueous);

104 parts vinyl chloride-vinyl acetate-maleic anhydride terpolymer emulsion ("Geon" 460×1 from B. F. Goodrich);

100 parts water.

B. 100 parts polyurethane latex from Hughson Chemical Div. of Lord Corp.;
5 parts silane (20% solution of an amino silane from Union Carbide Co.).

C. 100 parts vinyl terpolymer ("Geon" 460×1);
100 parts neoprene latex (4030 from DuPont);
100 parts acrylic latex ("Rhoplex" AC-72 from Rohm & Haas);
9 parts alkyl modified melamine-formaldehyde resin crosslinker ("Cymel" 385 from American Cyanamide Co.).

D. 40 parts phenolic resin dispersion (SP-6701, 30% in water, from Schenectady Chemicals, Inc.);
50 parts polyurethane latex (A-2701-44, from Hughson Chemical Div. of Lord Corp.);
40 parts acrylic latex ("Rhoplex" AC-73 from Rohm & Haas).

E. 66 parts vinyl terpolymer ("Geon" 460×1);
66 parts neoprene latex (DuPont 4030);
66 parts acrylic latex ("Rhoplex" AC-22 from Rohm & Haas);
9 parts alkylated melamine-formaldehyde resin crosslinker ("Cymel" 385 from American Cyanamid Co.).

F. 80 parts emulsifier free polyurethane latex (E-723 from Mobay Chemical Corp.);
32 parts trimethylol phenol (50% phenolic resole in "Cellosolve").

G. 20 parts emulsifier-free polyurethane latex (E-471 from Mobay Chemical Corp.);
10 parts trimethylol phenol (50% phenolic resole in "Cellosolve").

H. 80 parts polyurethane-styrene latex, from Hughson Chemical Div. of Lord Corp.;
64 parts polyurethane latex from Hughson Chemical Div. of Lord Corp.);
36 parts phenolic resole (FRS-842 from Schenectady Chemicals, Inc.).

When the foregoing adhesives were tested by the standard tests described above only formulation G made according to the present invention gave a stock break on initial pull test. The others gave initial pull test strengths as follows in pounds per linear inch. A-3; B-6; C-3; D-3; E-5; F-8; and H-3 PLI. Sample G provided the excellent result of a stock break after one hour in boiling water. Sample B gave an adhesion of 6 PLI and Sample H an adhesion of 4 PLI after the boiling water test. All other samples failed the boiling water test completely.

It is apparent from the foregoing that the new two-part water based adhesives provide not only superior initial adhesion but also superior adhesion after the dimple test, and especially superior resistance to boiling water, when compared to the laminating resins of the prior art.

The part A formulations of the invention described above may be packaged as single package adhesives which are suitable for many purposes without the use of the part B crosslinkers, although the bond strengths and environmental resistance provided by such adhesives will be less than that available from the two-package cross-linked adhesives. Similarly, these part A emulsions may be used as such, or suitably modified as known per se as coatings and primers for a variety of purposes and particularly to improve the adhesion of vinyl plastisols to metal. The properties of the new polyurethane-phenolic-formaldehyde resin emulsions can be modified by the inclusion of other known polymers, particularly acrylic latexes, to improve their adhesion to various substrates.

What is claimed is:

1. An aqueous composition comprising:
   (a) an aqueous polyurethane latex substantially free of emulsifier and containing from about 0.02 to about 1% by weight of the dispersed phase of a salt type group selected from the class consisting of $-COO-$, $-SO_2O-$, $-\underset{|}{P}OO-$ and $-O-$;

(b) an aqueous casein-cocondensed phenolic-formaldehyde resin emulsion; and
   (c) a non-ionic fluorocarbon surfactant; said composition being in the form of a stable emulsion containing about 25 to about 99% (a), about 1 to about 50% (b) and about 1 to about 10,000 parts per million (c), all by weight of the total composition.

2. A composition according to claim 1 having a total solids content in the range from about 15 to about 30 percent by weight.

3. A composition according to claim 1 having incorporated therein at least one formaldehyde donor.

4. A composition according to claim 3 wherein the amount of said formaldehyde donor is in the range from 1 part by weight per 2.5 parts by weight of (a), (b), and (c) to 1 part by weight per 100 parts by weight of (a), (b), and (c).

5. A composition according to claim 4 wherein the aqueous casein-cocondensed phenolic-formaldehyde resin emulsion is derived from resorcinol.

6. A water-based composition according to claim 1 wherein said polyurethane latex has been chain extended with a compound having reactive hydrogen atoms selected from the group consisting of glycols, diamines, amino alcohols and water.

7. A water-based composition according to claim 1 comprising, in addition, a third polymeric emulsion, said third polymeric emulsion being different from (a) and (b).

8. A water-based composition according to claim 7 wherein the third emulsion is an acrylic emulsion.

9. A water-based composition according to claim 1 wherein the polyurethane latex is derived from an aromatic diisocyanate.

10. A water-based composition according to claim 9 wherein the aromatic diisocyanate is toluene diisocyanate.

11. A two-part water-based composition for laminating vinyl to metal in which part A is a composition according to claim 1, and part B is a crosslinking agent selected from the group consisting of glyoxal and formaldehyde and formaldehyde donors selected from the group consisting of polyformaldehyde, ureaformaldehyde resins, dimethylol urea, and hexamethylene tetramine, paraformaldehyde, s-trioxane and anhydroformaldehyde-aniline, and alkyl modified melamines.

12. A water-based composition according to claim 11 wherein the alkyl modified melamine crosslinker is derived from hexamethoxymethyl melamine by substituting at least one of the methoxy groups thereof with a group selected from the group consisting of lower alkoxy groups other than methoxy, and hydroxyl groups.

* * * * *